(12) United States Patent
Choi et al.

(10) Patent No.: US 9,784,834 B2
(45) Date of Patent: Oct. 10, 2017

(54) IMAGE SENSING APPARATUS AND OPERATIONS USING BURST MODE

(71) Applicant: Samsung Electronics Co., Ltd., Suwon-si (KR)

(72) Inventors: Jaehyuk Choi, Seoul (KR); Joonah Park, Seoul (KR); Jungsoon Shin, Yongin-si (KR); Du-Sik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 14/602,936

(22) Filed: Jan. 22, 2015

(65) Prior Publication Data

US 2016/0047912 A1 Feb. 18, 2016

(30) Foreign Application Priority Data

Aug. 18, 2014 (KR) ........................ 10-2014-0107059

(51) Int. Cl.
| | |
|---|---|
| *G01S 17/06* | (2006.01) |
| *G01S 17/42* | (2006.01) |
| *G01S 17/46* | (2006.01) |
| *G01S 17/88* | (2006.01) |
| *G06F 3/01* | (2006.01) |

(52) U.S. Cl.
CPC .............. *G01S 17/06* (2013.01); *G01S 17/42* (2013.01); *G01S 17/46* (2013.01); *G01S 17/88* (2013.01); *G06F 3/017* (2013.01)

(58) Field of Classification Search
CPC .......... G01S 17/06; G01S 17/42; G01S 17/46; G01S 17/88; G06F 3/017
See application file for complete search history.

(56) References Cited

U.S. PATENT DOCUMENTS

| | | | |
|---|---|---|---|
| 2008/0186475 A1* | 8/2008 | Kawata ................ | G01B 11/026 356/73 |
| 2012/0200486 A1 | 8/2012 | Meinel et al. | |
| 2014/0139486 A1 | 5/2014 | Mistry et al. | |
| 2014/0139488 A1 | 5/2014 | Hsu et al. | |

FOREIGN PATENT DOCUMENTS

| | | |
|---|---|---|
| JP | 9-229620 A | 9/1997 |
| JP | 2008-27242 A | 2/2008 |
| KR | 10-2011-0083829 A | 7/2011 |
| KR | 10-2013-0111688 A | 10/2013 |
| KR | 10-2014-0006465 A | 1/2014 |
| KR | 10-2014-0056986 A | 5/2014 |

\* cited by examiner

*Primary Examiner* — Francis M Legasse, Jr.
(74) *Attorney, Agent, or Firm* — NSIP Law

(57) ABSTRACT

An image sensing apparatus sensing a user input and an operating method of the image sensing apparatus are disclosed, in which the image sensing apparatus may include an optical source operating based on a burst mode including a turn-on cycle and a turn-off cycle, and an image sensor configured to receive a reflected light using a pixel array and output sensing data of a position of an object in a target area in the reflected light.

25 Claims, 22 Drawing Sheets

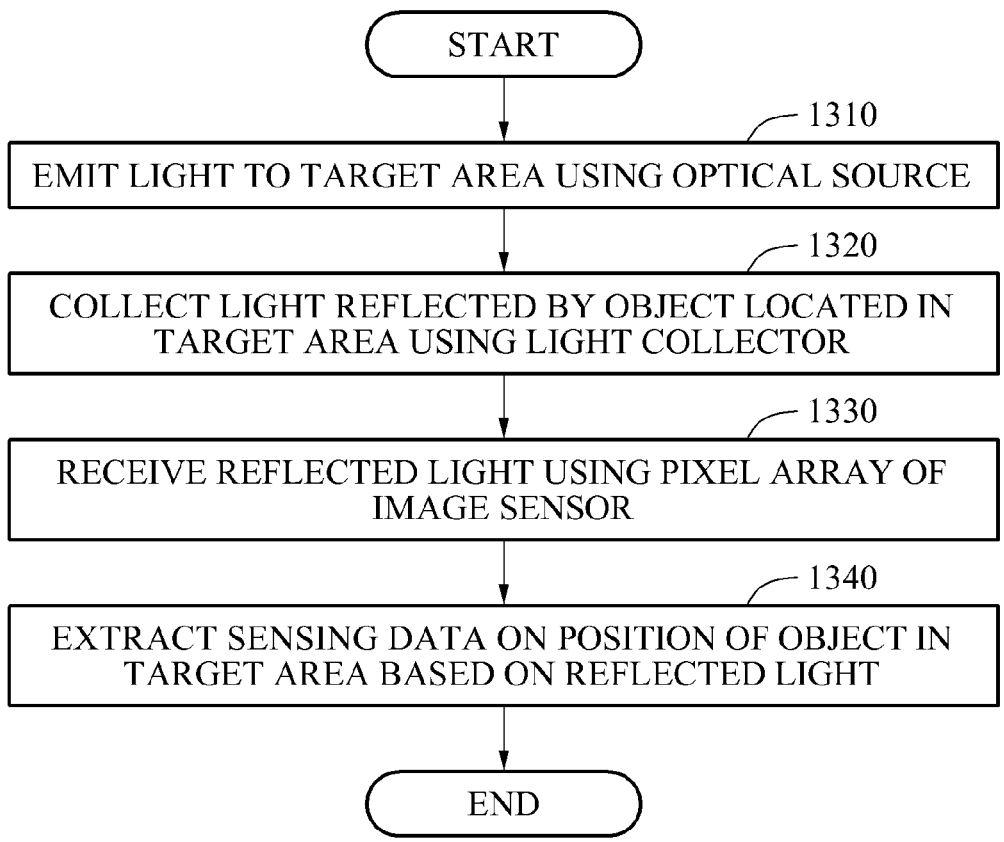

IMAGE SENSING APPARATUS AND OPERATIONS USING BURST MODE

CROSS-REFERENCE TO RELATED APPLICATION

This application claims the benefit under 35 USC 119(a) of Korean Patent Application No. 10-2014-0107059, filed on Aug. 18, 2014, in the Korean Intellectual Property Office, the entire disclosure of which is incorporated herein by reference for all purposes.

BACKGROUND

1. Field

The following description relates to an image sensing apparatus.

2. Description of Related Art

Recently, an interface environment for a terminal has been diversified for user convenience. For example, a touchless control is a method of controlling a terminal without touching a touch screen or a button of the terminal.

The touchless control may use a proximity sensor. The proximity sensor provides depth information based on a user input. The terminal then recognizes a distance between the user and the terminal based on the depth information. The terminal performs a necessary operation based on the distance between the user and the terminal.

However, aside from the depth information, leftward and rightward movements or upward and downward movements may not be obtained by using the proximity sensor. Thus, the depth information of the terminal to recognize a user input is limited.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided an image sensing apparatus, including an optical source configured to emit light to a target area; a light collector configured to collect light reflected by an object located in the target area; and an image sensor configured to receive the reflected light using a pixel array and output sensing data of a position of the object in the target area based on the reflected light, wherein the optical source is configured to operate in a burst mode comprising a turn-on cycle and a turn-off cycle.

The pixel array may include two-dimensionally arranged pixels, and wherein, in response to the optical source operating in the burst mode, at least a portion of output data of the pixels may be merged to be processed.

The at least a portion of the output data of the pixels may be merged based on a charge domain, an analog domain, or a digital domain based on a readout circuit of the reflected light.

The image sensor may be configured to operate as an array sensor configured to sense a three-dimensional (3D) position of the object or a line sensor configured to sense a two-dimensional (2D) position of the object.

In response to the target area being defined as a 2D plane, the image sensor may be configured to operate as the line sensor configured to sense the object located on the 2D plane.

The target area may be defined as the 2D plane in response to a contact between the object and the 2D plane, and wherein the contact may be sensed based on at least one of a vibration and a sound occurring in the target area.

In response to the target area being defined as a 3D space, the image sensor may be configured to operate as the array sensor configured to sense the object located in the 3D space.

The image sensor may include the pixel array configured to output an amount of the reflected light as a voltage; a row scanner configured to select a row pixel of the pixel array; a column scanner configured to select a column pixel of the pixel array; and an analog-to-digital converter (ADC) configured to convert to a digital signal an analog voltage of a pixel selected by the row scanner and the column scanner.

The pixel array may include pixels arranged in a linear circuit and a photodiode connected to the circuit, and wherein the photodiode may be connected to the circuit and has a long shape.

The apparatus may also include a subtractor configured to eliminate external light based on a difference between an amount of light in the turn-on cycle and an amount of light in the turn-off cycle.

The apparatus may also include a memory configured to store the amount of light in the turn-on cycle to eliminate the external light.

In accordance with another embodiment, there is provided a portable device, including an image sensing unit including an optical source configured to emit light to a target area, a light collector configured to collect light reflected by an object in the target area, and an image sensor configured to receive the reflected light through a pixel array and output sensing data; and a processor configured to determine a position of the object in the target area using the sensing data, wherein the optical source is configured to operate based on a burst mode comprising a turn-on cycle and a turn-off cycle.

The pixel array may include two-dimensionally arranged pixels, and wherein, in response to the optical source operating in the burst mode, at least a portion of output data of the pixels may be merged to be processed.

The processor may be configured to define the target area as a two-dimensional (2D) plane or a three-dimensional (3D) space, and generate a control signal to allow the image sensing unit to switch an operation as an array sensor to sense a 3D position of the object or as a line sensor to sense a 2D position of the object.

The portable device may also include a sensor configured to sense at least one of a vibration and a sound occurring in the target area, wherein the processor is configured to define the target area as the 2D plane based on the at least one of the vibration and the sound occurring in the target area.

The target area may be at least a portion of a body of a user, and the object is a finger of the user.

The pixel array may include pixels two-dimensionally arranged in rows and columns, each pixel including a circuit and a photodiode connected to the circuit and detecting an amount and a distribution of reflected light, wherein a row value of the rows of the pixels and a column value of the columns of the pixels indicate addresses of the detected amount of the reflected light, wherein the image sensor further may also include a row scanner configured to select a row pixel of the pixel array; and a column scanner configured to select a column pixel of the pixel array.

The column scanner may sequentially select the column pixel based on the selected row pixel, and transmit a voltage output of the pixel array to an analog to digital converter to convert the voltage output to a digital signal.

The image sensor using the pixel array may operate as a line sensor in one time section or as an array sensor in another time section to reduce power consumption.

The processor may determine the position of the object based on an address of the pixel array having a largest amount of reflected light.

The turn-on cycle may be shorter than the turn-off cycle.

In accordance with a further embodiment, there is provided an operating method of an image sensing apparatus, including emitting light to a target area using an optical source; collecting light reflected by an object located in the target area using a light collector; receiving the reflected light using a pixel array of an image sensor; and outputting sensing data of a position of the object in the target area based on the reflected light.

The method may include configuring the optical source to operate based on a burst mode comprising a turn-on cycle and a turn-off cycle.

The pixel array comprises two-dimensionally arranged pixels, and further include in response to the optical source operating in the burst mode, merging at least a portion of output data of the pixels to be processed.

The method may include configuring the image sensor to operate as an array sensor to sense a three-dimensional (3D) position of the object or a line sensor to sense a two-dimensional (2D) position of the object.

The method may include configuring the pixel array to comprise pixels two-dimensionally arranged in rows and columns, each pixel comprising a circuit and a photodiode connected to the circuit and detecting an amount and a distribution of reflected light.

In response to an amount of reflected light decreasing due to a decrease in an amount of the emitted light, the method may include compensating the decrease in the amount of the reflected light by widening an area of the photodiode.

Other features and aspects will be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which:

FIG. 13 is a flowchart illustrating an example of an operating method of an image sensing apparatus, in accordance with an embodiment.

Figure 1A:
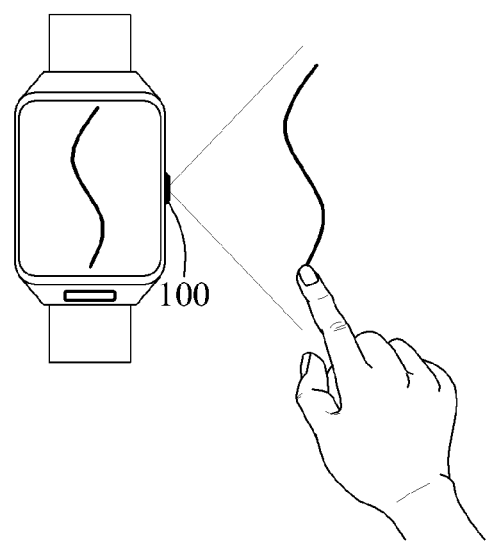
FIGS. 1A through 1D are diagrams illustrating examples of a user input to a wearable device and a terminal including an image sensing apparatus, in accordance with an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIGS. 1A through 1D are diagrams illustrating examples of a user input to a wearable device and a terminal including an image sensing apparatus 100, in accordance with an embodiment.

Figure 1B:
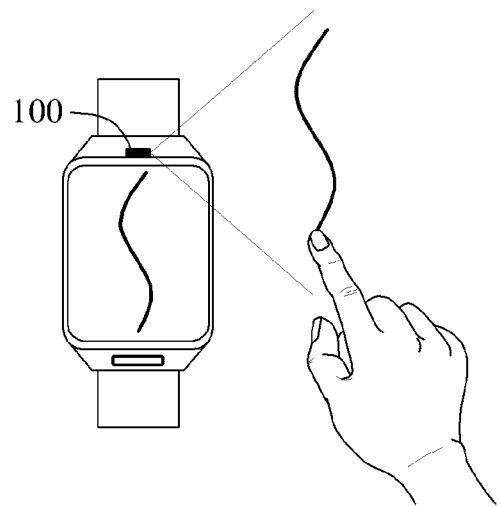
Figure 1C:
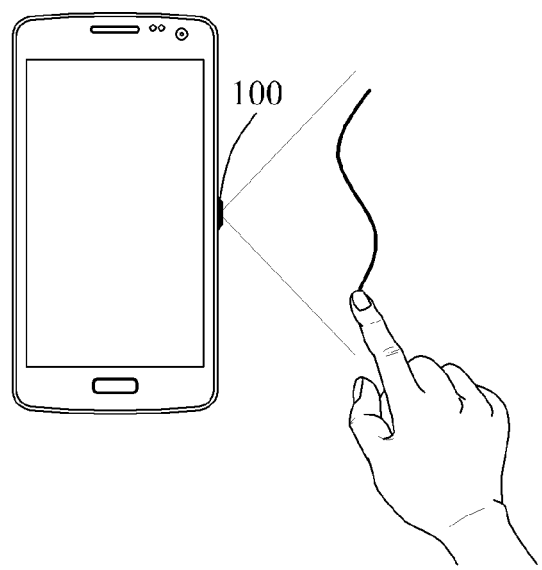
Figure 1D:
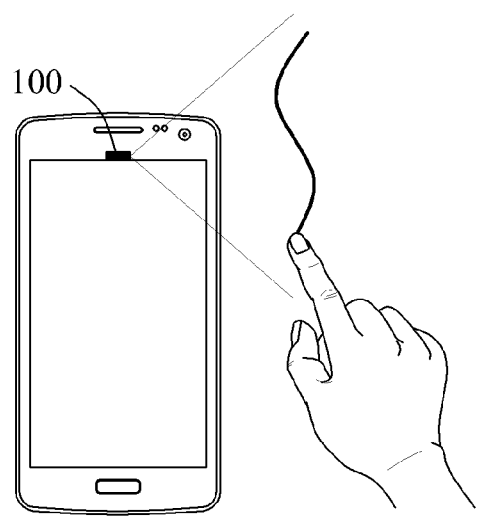

FIG. 1A illustrates an example of a wearable device including the image sensing apparatus 100 provided on a side of the wearable device. FIG. 1B illustrates an example of a wearable device including the image sensing apparatus 100 provided on a front side of the wearable device. FIG. 1C illustrates an example of a terminal including the image sensing apparatus 100 provided on a side of the terminal. FIG. 1D illustrates an example of a terminal including the image sensing apparatus 100 provided on a front side of the terminal.

A user performs a touchless input using an object in a target space area to allow the image sensing apparatus 100 to sense the input from the user. The target space area is an area at a predetermined distance apart from the image sensing apparatus 100 or a display surface of the wearable device or the terminal, in which the image sensing apparatus 100 senses a position of an object, such as a finger, and movement thereof. The object used for the touchless input may be, for example, a finger of the user or a stylus pen.

The image sensing apparatus 100 outputs sensing data indicative of a position of the object in the target space area. In addition, the image sensing apparatus 100 outputs sensing data indicative of a movement of the object based on a change in the position of the object. The wearable device and the terminal including the image sensing apparatus 100 perform an operation in response to the input from the user based on the sensing data output from the image sensing apparatus 100.

Referring to FIG. 1A, the image sensing apparatus 100 is located on the side of the wearable device. A movement performed using a finger of the user is detected in the target space area of the image sensing apparatus 100. The image sensing apparatus 100 senses a position of the finger and the movement thereof. The wearable device then performs an operation in response to the input from the user based on the sensed position of the finger and the sensed movement.

The image sensing apparatus 100 may be included in all devices that process a user input based on an image, in addition to the wearable device and the terminal illustrated in FIGS. 1A through 1D. The image sensing apparatus 100 may be disposed on a left side, a right side, an upper side, a lower side, a front side, a back side, or a corner of a device to sense an image, in addition to positions illustrated in FIGS. 1A through 1D.

Figure 2:
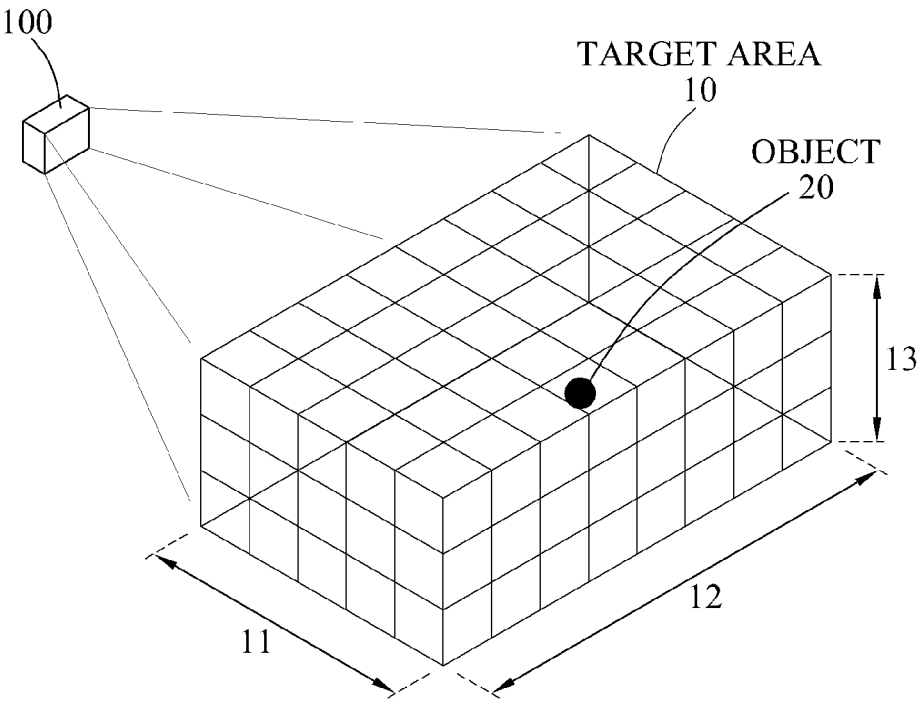
FIG. 2 is a diagram illustrating an example of a target area in which an image sensing apparatus senses an object, in accordance with an embodiment.

FIG. 2 is a diagram illustrating an example of a target space area or a target area 10 in which the image sensing apparatus 100 senses an object 20, in accordance with an embodiment.

In the example of FIG. 2, the image sensing apparatus 100, the target area 10, and the object 20 are illustrated. The target area 10 is the space area in which the image sensing apparatus 100 senses an input from a user. The image sensing apparatus 100 senses the input from the user based on a position of the object 20, such as the user's finger, in the target area 10 and a movement of the object 20.

The position and the movement of the object 20 are described using a z axis 11 indicating a depth from the image sensing apparatus 100, an x axis 12 indicating a right and left direction, and a y axis 13 indicating an up and down direction. The position and the movement of the object 20 on a two-dimensional (2D) plane are described using an x-z plane, and the position and the movement of the object 20 in a three-dimensional (3D) space are described using an x-y-z space.

Figure 3:
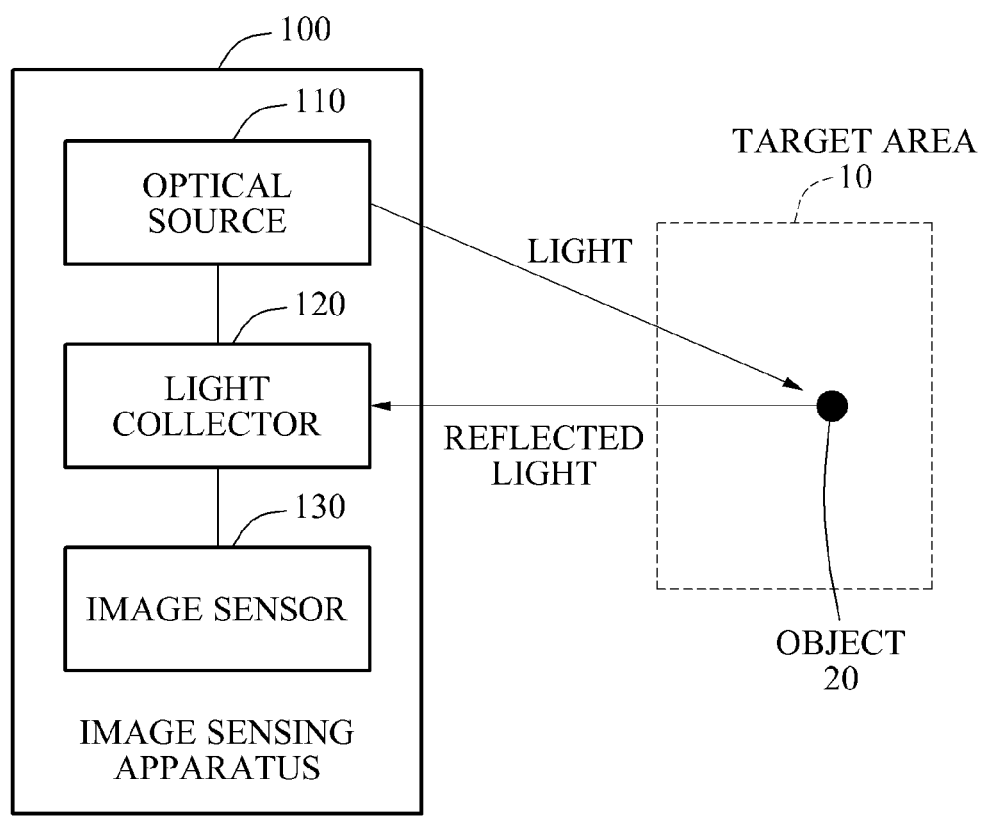
FIG. 3 is a diagram illustrating an example of an image sensing apparatus, in accordance with an embodiment.

FIG. 3 is a diagram illustrating an example of an image sensing apparatus 100, in accordance with an embodiment.

Referring to FIG. 3, the image sensing apparatus 100 includes an optical source 110, a light collector 120, and an image sensor 130.

The optical source 110 emits light to a target area 10. In one example, the optical source 110 is exposed at an outside surface of the image sensing apparatus 100 to emit light to the target area 10.

The optical source 110 is, for example, a light emitting diode (LED) based source, a laser, an incandescent source, such as a filament lamp and a halogen lamp, and a fluorescent source. The LED based source may be, for example, an infrared LED, an ultraviolet LED, a red LED, a blue LED, a green LED, a yellow LED, an amber LED, an orange LED, and a white LED. Among the foregoing examples, the optical source 110 is the infrared LED.

The optical source 110 operates based on a burst mode including a turn-on cycle and a turn-off cycle. The optical source 110 reduces power consumption using the burst mode. A description of the burst mode will be provided with reference to FIGS. 7A and 7B and 8A through 8D.

The light collector 120 collects light reflected by an object 20 located in the target area 10. The light collector 120 includes a condensing lens or a pinhole to collect the reflected light.

The image sensor 130 includes a pixel array. The pixel array includes a circuit and a photodiode connected to the circuit. The image sensor 130 includes a row scanner to select a row pixel of the pixel array, a column scanner to select a column pixel of the pixel array, and an analog-to-digital converter (ADC) to convert an analog voltage of a row pixel and a column pixel selected by the row scanner and the column scanner, respectively, to a digital signal. A detailed configuration of the image sensor 130 will be described with reference to FIG. 4.

The image sensor 130 receives the reflected light collected by the light collector 120 using the pixel array. The image sensor 130 obtains a distribution of an amount of light through the pixel array. In addition, the image sensor 130 outputs sensing data of a position of the object 20 in the target area based on the distribution of the amount of the light. A description of the sensing data on the position of the object 20 will be provided with reference to FIGS. 6A and 6B.

Figure 4:
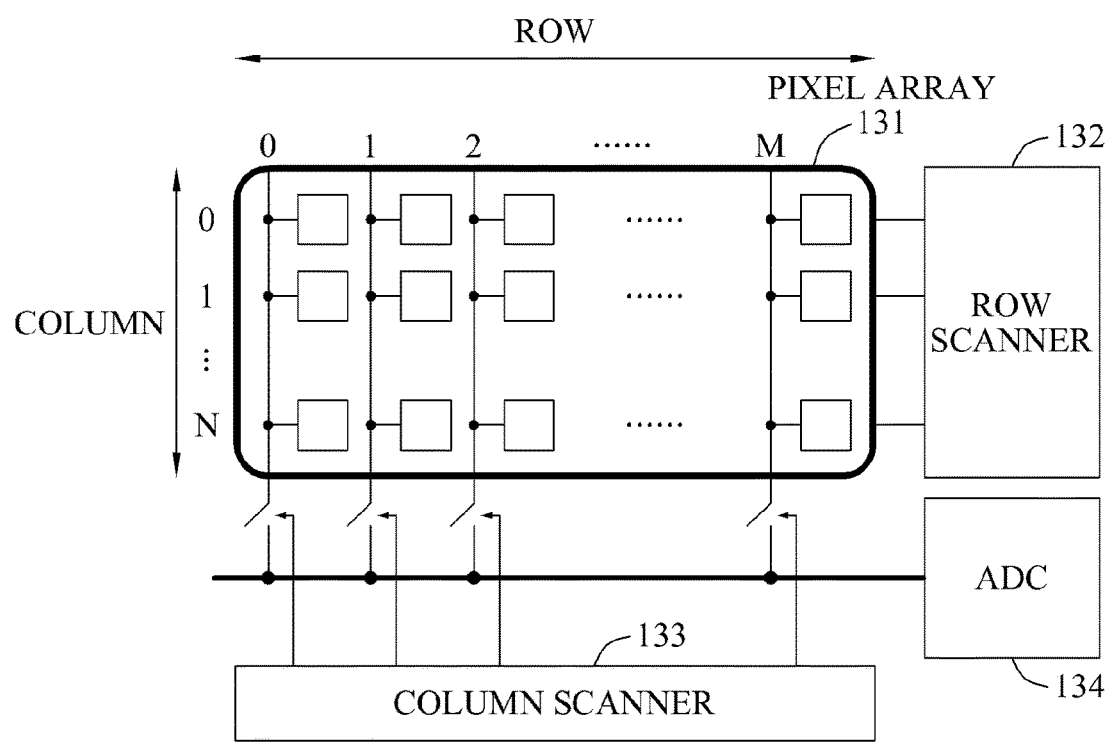
FIG. 4 is a diagram illustrating an example of a configuration of an image sensor, in accordance with an embodiment.

FIG. 4 is a diagram illustrating an example of a configuration of an image sensor, in accordance with an embodiment.

Referring to FIG. 4, the image sensor includes a pixel array 131, a row scanner 132, a column scanner 133, and an ADC 134.

The pixel array 131 includes a plurality of pixels. The pixels are two-dimensionally arranged in 0 through M rows and 0 through N columns Each pixel includes a circuit and a photodiode connected to the circuit. Each pixel detects an amount of reflected light and outputs the detected amount of the reflected light as a voltage.

A row value of the 0 through M rows of the pixels and a column value of the 0 through N columns of the pixels indicate addresses of the detected amount of the reflected light. The image sensor determines a distribution of the detected amount of the reflected light based on the addresses of the detected amount of the reflected light, which is indicated as the 0 through M rows and the 0 through N columns.

The row scanner 132 selects a row pixel of the pixel array 131.

The column scanner 133 selects a column pixel of the pixel array 131. The column scanner 133 sequentially selects the column pixel from the row pixel selected by the row scanner 132, and transmits a voltage output of the pixel array 131 to the ADC 134.

The ADC 134 converts an analog voltage of the pixel selected by the row scanner 132 and the column scanner 133 to a digital signal.

Figure 5A:
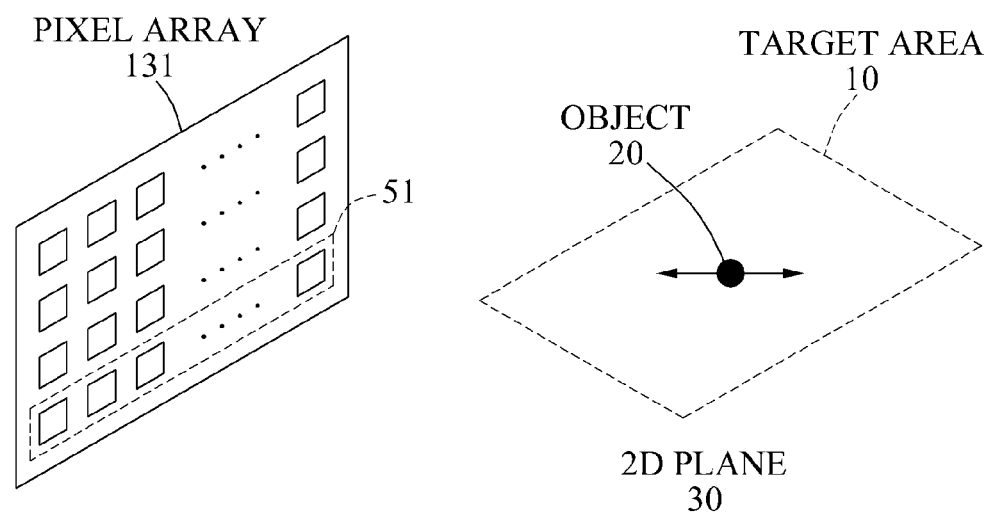
FIGS. 5A and 5B are diagrams illustrating examples of a sensing operation of an image sensor with respect to a two-dimensional (2D) plane and a three-dimensional (3D) space, in accordance with an embodiment.
Figure 5B:
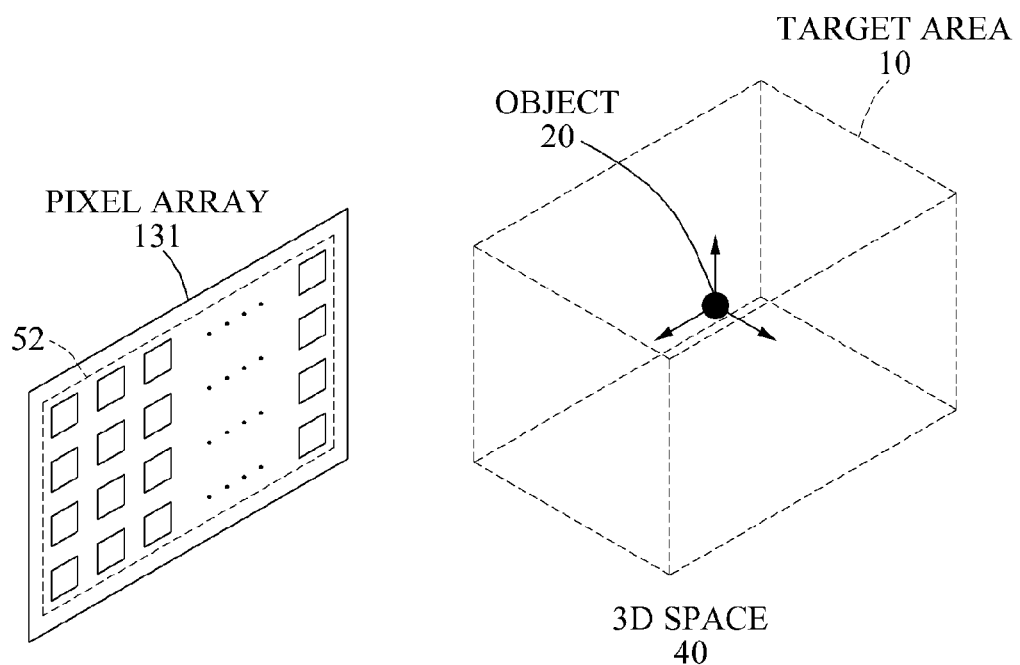

FIGS. 5A and 5B are diagrams illustrating examples of a sensing operation of an image sensor with respect to a 2D plane 30 and a 3D space 40, in accordance with an embodiment.

In a pixel array 131 having 0 through M rows and 0 through N columns, a pixel resolution is indicated as M×N. The pixel resolution is determined based on a moving range of an object 20, or a size of a target area 10. When the moving range of the object 20 is wider towards an x axis, a greater number of column pixels are needed. Similarly, when the moving range of the object 20 is wider towards a y axis, a greater number of row pixels are needed.

In an example, to sense a position of the object 20 with respect to the 2D plane 30, the pixel array 131 uses M×N pixels, in which a value of M is considerably greater than a value of N. The image sensor using the pixel array 131 in which the value of the M is considerably greater than the value of N is defined as an x-z sensor or a line sensor.

In another example, to sense a position of the object 20 with respect to the 3D space 40, the pixel array 131 uses M×N pixels, in which a value of M is large and a value of N is large. The image sensor using the pixel array 131 in which the value of M is large and the value of N is large is defined as an x-y-z sensor or an array sensor.

In one example, the image sensor using the pixel array 131 in which the value of M is large and the value of N is large operates as the line sensor, as necessary. In another example, the image sensor using the pixel array 131 in which the value of M is large and the value of N is large switches a sensing operation by operating as the array sensor or the line sensor, as necessary. For instance, the image sensor operates as the array sensor during a first time section in an entire sensing time and as the line sensor during a second time section in the entire sensing time. By switching the sensing operation to the line sensor, power consumed to sense the object 20 is reduced.

Referring to FIG. 5A, when the object 20 is located on the 2D plane 30 or moves within the 2D plane 30, the target area 10 is defined as the 2D plane 30. When the target area 10 is defined as the 2D plane 30, the image sensor operates as the line sensor to sense the object 20 located on the 2D plane 30. The image sensor senses a position and a movement of the object 20 using a portion of row pixels 51 of the pixel array 131.

In an example, the target area 20 is defined as the 2D plane 30 in response to the object 20 in contact with the 2D plane 30. The contact of the object 20 is detected based on at least one of a vibration and a sound occurring in the target area 10. For example, when the 2D plane 30 is a dorsum of a hand of the user and the object 20 is a finger of the user, the target area 10 is defined as the 2D plane 30 based on at least one of a vibration and a sound occurring when the finger is in contact with the dorsum of the hand.

Referring to FIG. 5B, when the object 20 is located in the 3D space 40 or moves within the 3D space 40, the target area 10 is defined as the 3D space 40. When the target area 10 is defined as the 3D space 40, the image sensor operates as the array sensor to sense a position of the object 20 located in the 3D space 40. The image sensor senses the position and a movement of the object 20 using column pixels 52 of the pixel array 131.

In an example, the target area 10 may be fundamentally or as a default defined as the 3D space 40. When the contact between the object 20 and the 2D plane 30 is detected, the target area 10 may then be defined as the 2D plane 30. However, when the contact between the object 20 and the 2D plane 30 is not detected for a predetermined period of time, the target area 10 may be defined as the 3D space 40 again.

Figure 6A:
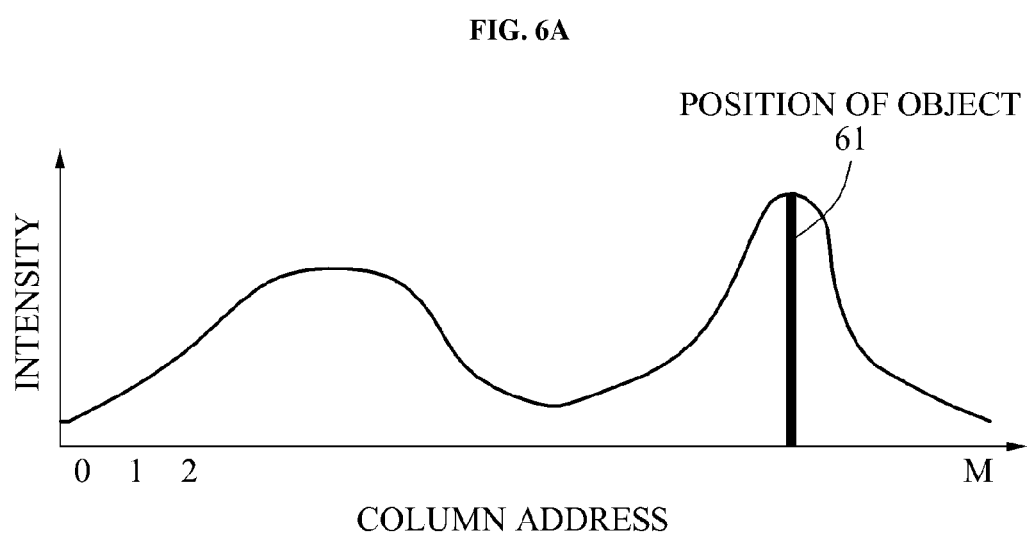
FIGS. 6A and 6B are graphs illustrating examples of sensing data, in accordance with an embodiment.
Figure 6B:
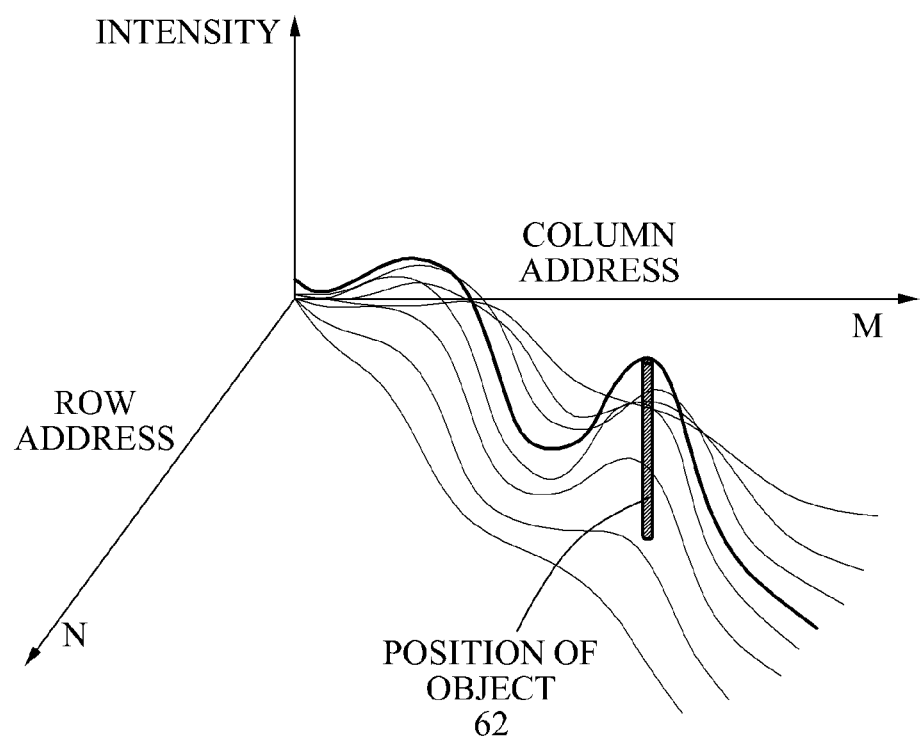

FIGS. 6A and 6B are graphs illustrating examples of sensing data, in accordance with an embodiment.

FIG. 6A illustrates an example of sensing data of an image sensor associated with line sensing. FIG. 6B illustrates an example of sensing data of the image sensor associated with array sensing. The sensing data includes an address value of a pixel array and an amount of light corresponding to the address value of the pixel array.

FIG. 6A illustrates an amount of light based on addresses of 0 through M rows. In the sensing data associated with the line sensing, an address of the pixel array is indicated as a row address. Referring to FIG. 6A, a position 61 of an object is determined based on an address of the pixel array having a largest amount of light and the amount of light corresponding to the address of the pixel array. In one example, an address of the pixel array is a position towards an x axis, and an amount of light is a position towards a z axis. An increase in the amount of light indicates closeness to the image sensor.

FIG. 6B illustrates an amount of light based on addresses of 0 through N columns and addresses of 0 through M rows. In the sensing data associated with the array sensing, an address of the pixel array is indicated as a column address and a row address. Referring to FIG. 6B, a position 62 of an object is determined based on an address of the pixel array having a largest amount of light and an amount of light corresponding to the address of the pixel array. In an address of the pixel array, the column address may indicate a position towards a y axis, the row address may indicate a position towards an x axis, and the amount of light may indicate a position towards a z axis. An increase in the amount of light is indicative of closeness of the object to the image sensor.

Figure 7A:
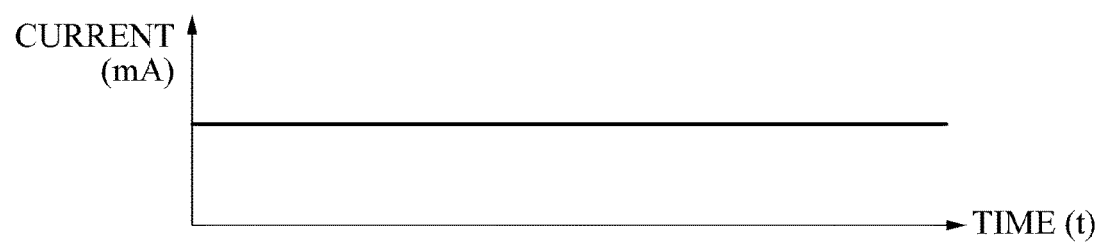
FIGS. 7A and 7B are graphs illustrating examples of a burst mode including a turn-on cycle and a turn-off cycle, in accordance with an embodiment.
Figure 7B:
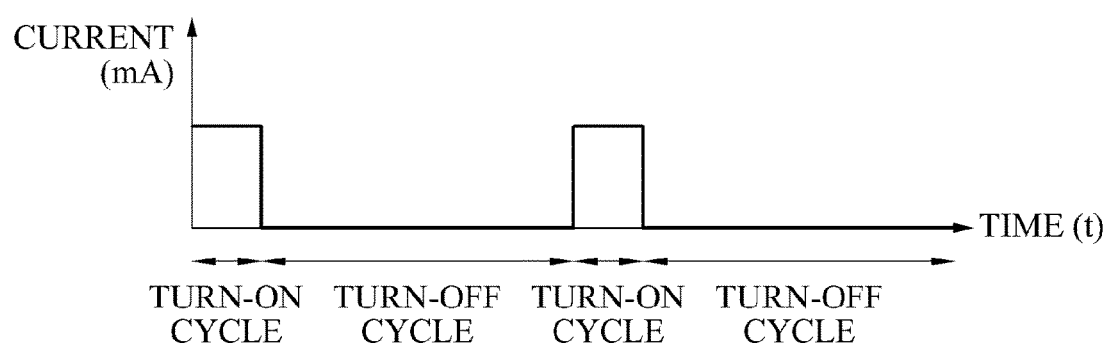

FIGS. 7A and 7B are graphs illustrating examples of a burst mode including a turn-on cycle and a turn-off cycle, in accordance with an embodiment.

FIG. 7A illustrates an example of an optical source input current in a continuous mode. FIG. 7B illustrates an example of an optical source input current in a burst mode. The burst mode indicates an operating mode including a turn-on cycle in which an optical source emits light during one cycle and a turn-off cycle in which the optical source is in an idle state. As illustrated in FIGS. 7A and 7B, an image sensing apparatus controls the continuous mode and the burst mode by controlling the optical source input current.

In the burst mode, the turn-on cycle is relatively shorter than the turn-off cycle. For example, when one cycle corresponds to 33 milliseconds (ms), the turn-on cycle is 0.33 ms equivalent to 1/100 of the one cycle, and the turn-off cycle is a remaining 32.67 ms of the one cycle. The burst mode is used to reduce power consumed when the optical source emits light. For example, when an infrared LED driven by a high current is used as the optical source, the optical source consumes a large amount of power to operate permanently. As a result, the burst mode effectively improves efficiency in power consumption.

FIGS. 8A through 8D are diagrams illustrating examples of a pixel configuration to compensate for a decrease in an amount of light, in accordance with an embodiment.

Figure 8A:
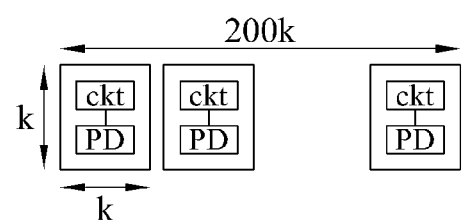
FIGS. 8A through 8D are diagrams illustrating examples of a pixel configuration to compensate for a decrease in an amount of light, in accordance with an embodiment.
Figure 8B:
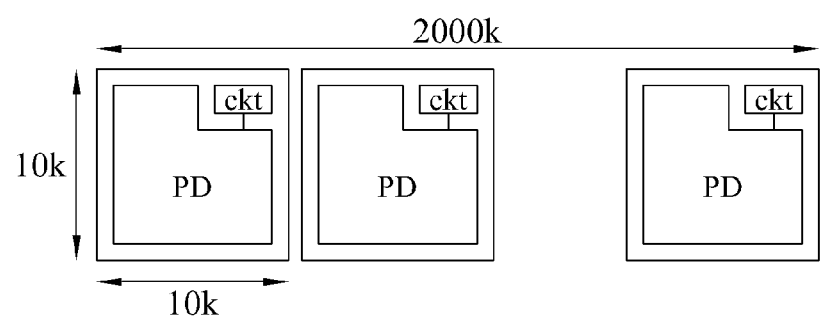
Figure 8C:
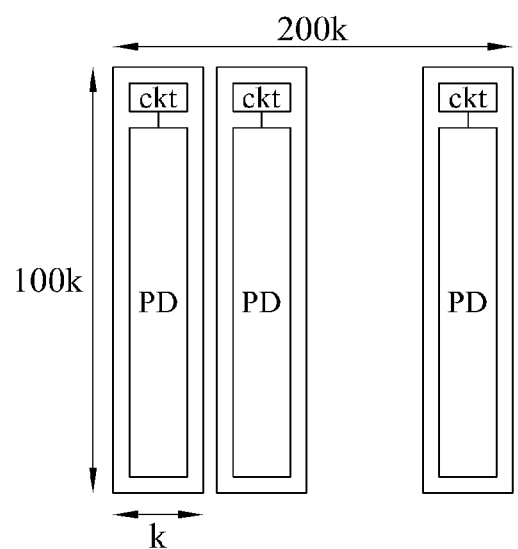
Figure 8D:
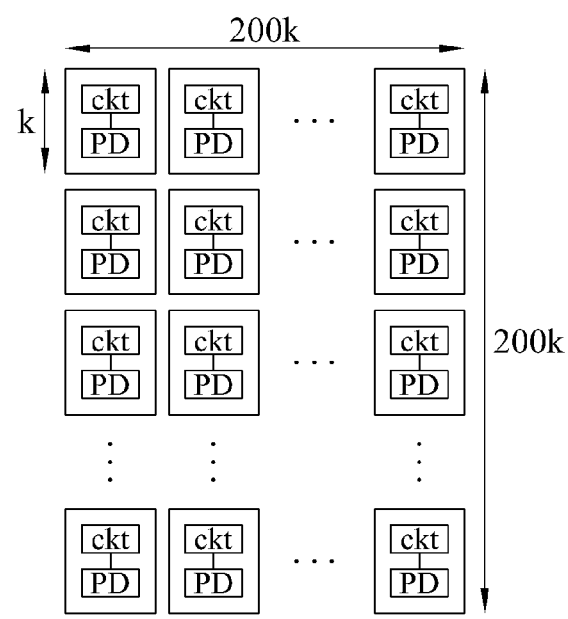

FIG. 8A illustrates an example of a general pixel configuration. FIGS. 8B through 8D illustrate examples of a pixel configuration to compensate for a decrease in an amount of light. When a burst mode operates, power consumption decreases. However, an amount of reflected light may decrease due to a decrease in an amount of emitted light. The decrease in the amount of the reflected light is compensated for by widening an area of a photodiode based on the examples of the pixel configuration illustrated in FIG. 8B through 8D.

FIG. 8B illustrates an example of a pixel configuration including a photodiode having a wide area. Referring to FIG. 8B, the photodiode has an area approximately 100 times larger than an area of a photodiode illustrated in FIG.

8A. The decrease in the amount of light due to the burst mode is compensated for by widening the area of the photodiode receiving light in a pixel. In an identical resolution, an overall size of a pixel array increases using the pixel configuration illustrated in FIG. 8B. Accordingly, a small form factor may not be easily obtained.

FIG. 8C illustrates an example of a pixel configuration including a photodiode having a long shape. Referring to FIG. 8C, the photodiode has the long shape in which a length is greater than a width. When a pixel array is in a form of a one-dimensional line, or an image sensor is a line sensor, the pixel configuration illustrated in FIG. 8C compensates for a decrease in an amount of light by obtaining a small form factor. When the image sensor is an array sensor, a form factor increases using the pixel configuration illustrated in FIG. 8C.

FIG. 8D illustrates an example of a pixel configuration including two-dimensionally arranged pixels. An image sensor compensates for a decrease in an amount of light by merging a portion of pixels among the two-dimensionally arranged pixels illustrated in FIG. 8D. When an optical source operates in the burst mode, the image sensor merges at least a portion of output data of the pixels and processes the data.

For example, the image sensor merges output data of upper and lower adjacent pixels, and processes the data. When x-z sensing is performed, the image sensor compensates for the decrease in the amount of light to increase sensitivity. When x-y-z sensing is performed, the image sensor operates as an array sensor.

The merging of the pixels are performed based on a charge domain, an analog domain, or a digital domain based on a readout circuit. A charge domain method is performed based on a sum of charges. An analog domain method is performed based on an average voltage. A digital domain method is performed based on addition.

Figure 9:
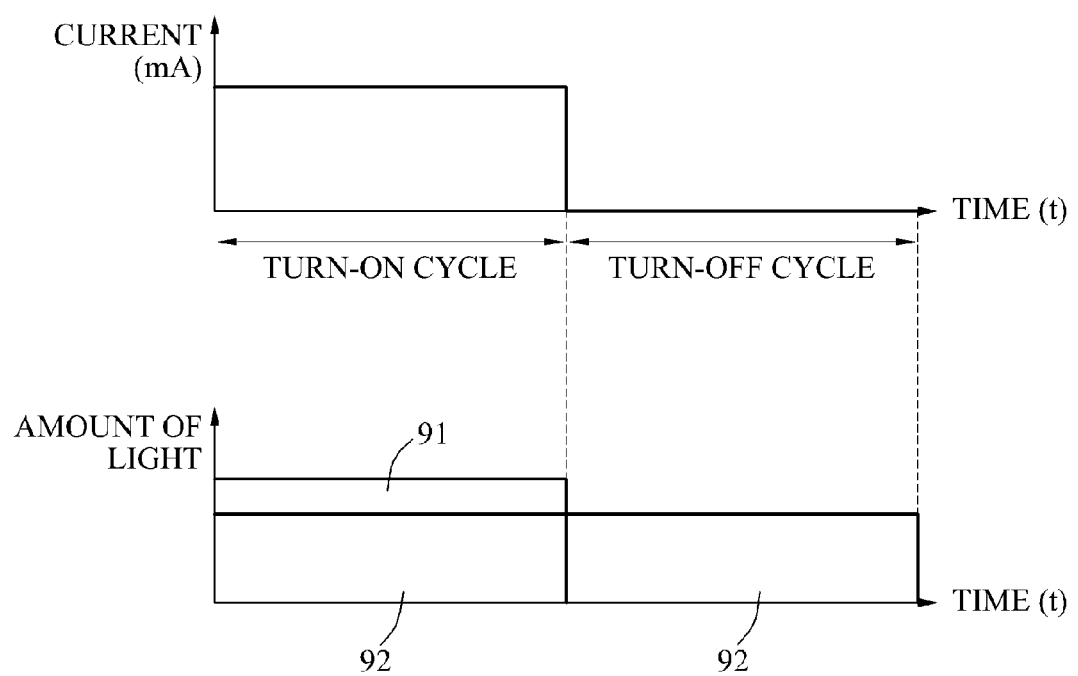
FIG. 9 is a graph illustrating an example of an operation for eliminating external light, in accordance with an embodiment.

FIG. 9 is a graph illustrating an example of an operation for eliminating external light, in accordance with an embodiment.

FIG. 9 illustrates an example of an amount of light received during a turn-on cycle and a turn-off cycle in a burst mode. In this example, the turn-on cycle and the turn-off cycle include an identical period of time. The amount of light is measured based on an output signal of a pixel array.

An amount of light during the turn-on cycle includes an amount 91 of reflected light and an amount 92 of external light. Thus, the amount 92 of the external light is eliminated by a difference between an amount of light in the turn-on cycle and an amount of light in the turn-off cycle. An image sensor obtains sensing data from which the external light is eliminated by a difference between an output signal of the pixel array obtained in the turn-on cycle and an output signal of the pixel array obtained in the turn-off cycle.

Figure 10:
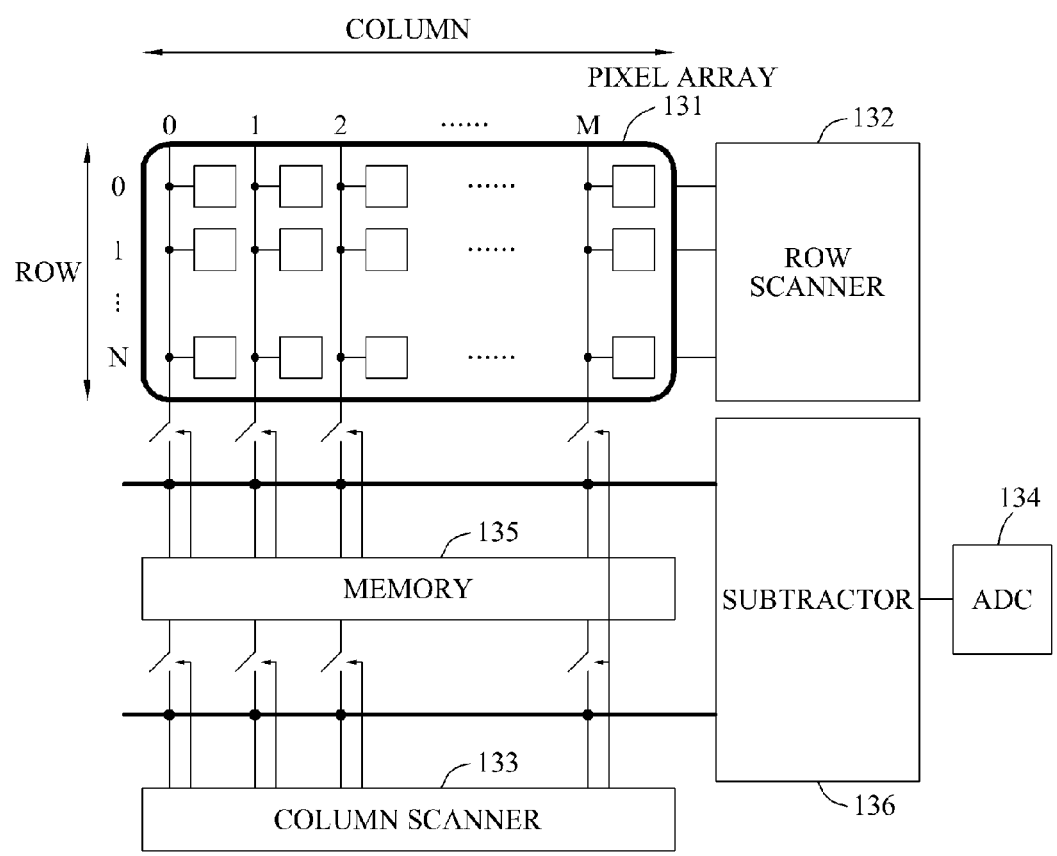
FIG. 10 is a diagram illustrating an example of a configuration of an image sensor to eliminate external light, in accordance with an embodiment.

FIG. 10 is a diagram illustrating an example of a configuration of an image sensor to eliminate external light, in accordance with an embodiment.

Referring to FIG. 10, the image sensor includes a pixel array 131, a row scanner 132, a column scanner 133, an ADC 134, a memory 135, and a subtractor 136 to eliminate the external light.

The pixel array 131 includes a plurality of pixels. The pixels are two-dimensionally arranged in 0 through M rows and 0 through N columns Each pixel includes a circuit and a photodiode connected to the circuit. Each pixel detects an amount of reflected light and outputs the detected amount as a voltage.

The row scanner 132 selects a row pixel of the pixel array 131.

The column scanner 133 selects a column pixel of the pixel array 131. In an example, the column scanner 133 sequentially selects the column pixel from the row pixel selected by the row scanner 132, and transmits a voltage output of the pixel array 131 to the memory 135 and the subtractor 136. The column scanner 133 alternately transmits to the memory 135 and the subtractor 136 a voltage output in a turn-on cycle and a turn-off cycle. For example, the column scanner 133 transmits the voltage output in the turn-on cycle to the memory 135 and the voltage output in the turn-off cycle to the subtractor 136.

The ADC 134 converts an analog voltage output from the subtractor 136 to a digital signal. The analog voltage output from the subtractor 136 is a signal from which the external light is eliminated.

The memory 135 temporarily stores an amount of light in the turn-on cycle to eliminate the external light. The amount of light in the turn-on cycle is indicative of the voltage output and transmitted from the pixel array 131 in the turn-on cycle. The memory 135 transmits a temporarily stored amount of light in the turn-off cycle to the subtractor 136.

The subtractor 136 eliminates the external light based on a difference between the amount of light in the turn-on cycle and the amount of light in the turn-off cycle. The subtractor 136 transmits the analog voltage from which the external light is eliminated to the ADC 134. The external light is eliminated from the analog voltage by subtracting the amount of light in the turn-off cycle received from the pixel array 131 from the amount of light in the turn-on cycle received from the memory 135.

Figure 11:
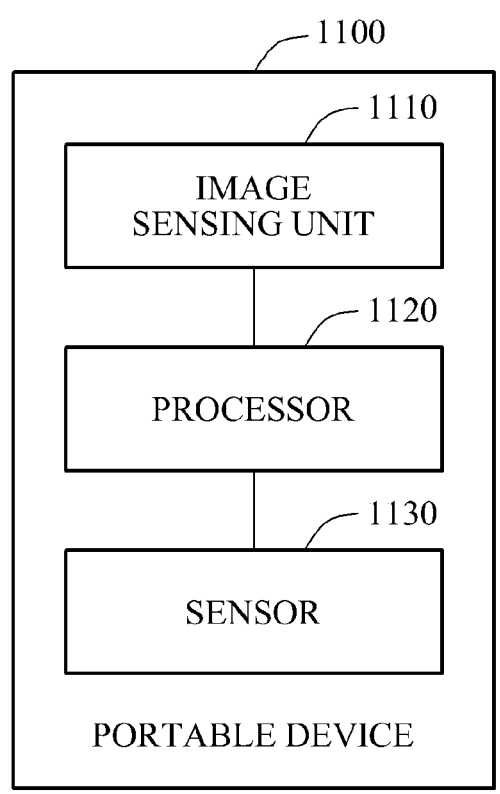
FIG. 11 is a block diagram illustrating an example of a configuration of a portable device, in accordance with an embodiment.

FIG. 11 is a block diagram illustrating an example of a configuration of a portable device 1100, in accordance with an embodiment.

Referring to FIG. 11, the portable device 1100 includes an image sensing unit 1110, a processor 1120, and a sensor 1130.

The image sensing unit 1100 includes an optical source 110, a light collector 120, and an image sensor 130.

The optical source 110 emits light to a target area. The optical source 110 is exposed to an outer surface of the portable device 1100 to emit light to a target area.

The optical source 110 may be, for example, a LED based source, a laser, an incandescent source such as a filament lamp and a halogen lamp, and a fluorescent source. The LED based source is, for example, an infrared LED, an ultraviolet LED, a red LED, a blue LED, a green LED, a yellow LED, an amber LED, an orange LED, and a white LED. Among the foregoing examples, the optical source 110 is the infrared LED.

The optical source 110 operates based on a burst mode including a turn-on cycle and a turn-off cycle. The optical source 110 reduces power consumption using the burst mode. The description of the burst mode provided in the foregoing may be applicable hereto.

The light collector 120 collects light reflected by an object located in the target area. The light collector 120 includes a condensing lens or a pinhole to collect the reflected light.

The image sensor 130 includes a pixel array. The pixel array includes a circuit and a photodiode connected to the circuit. The image sensor 130 includes a row scanner to select a row pixel of the pixel array, a column scanner to select a column pixel of the pixel array, and an ADC to convert an analog voltage of a pixel selected by the row scanner and the column scanner to a digital signal. The configuration of the image sensor 130 detailed in the foregoing may be applicable hereto.

The image sensor 130 receives the reflected light collected by the light collector 120 using the pixel array. The image sensor 130 obtains a distribution of an amount of light through the pixel array. The image sensor 130 outputs sensing data on a position of the object in the target area based on the distribution.

The processor 1120 determines the position of the object in the target area based on the sensing data output from the image sensing unit 1110. The processor 1120 generates a control command required for operations of the image sensing unit 1110 and the sensor 1130, and transmits the generated control command to the image sensing unit 1110 and the sensor 1130.

The processor 1120 defines the target area as a 2D plane or a 3D space. The processor 1120 generates a control signal to allow the image sensing unit 1110 to switch an operation between an array sensor detecting a 3D position of the object and a line sensor detecting a 2D position of the object. The processor 1120 defines the target area as the 2D plane based on at least one of a vibration and a sound occurring in the target area and sensed by the sensor 1130. The processor 1120 transmits the generated control signal to the image sensing unit 1110.

The sensor 1130 includes a sensor, for example, an acceleration sensor, a gyro sensor, a geomagnetic sensor, and an altimeter, to sense a vibration, a movement, a moving direction, a moving speed of the portable device 1100. The sensor 1130 also includes a sensor, for example, a microphone, to detect the sound occurring in the target area.

Figure 12:
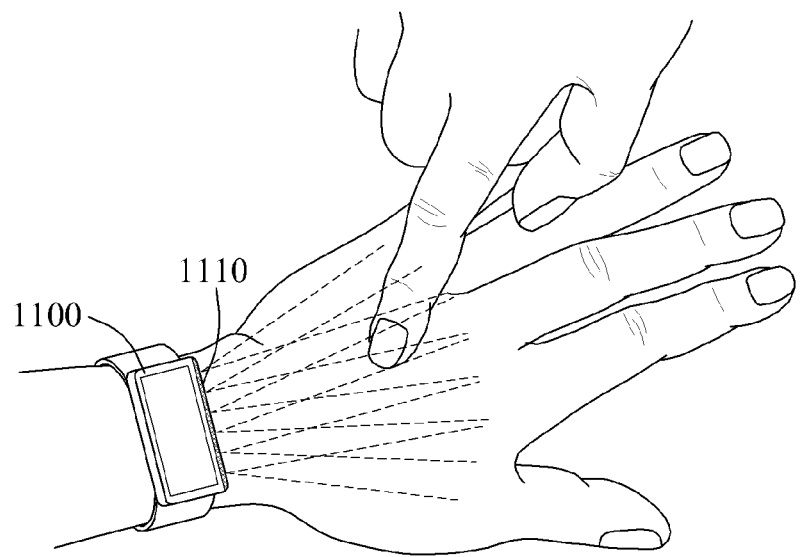
FIG. 12 is a diagram illustrating an example of an operation of a portable device, in accordance with an embodiment.

FIG. 12 is a diagram illustrating an example of an operation of a portable device 1100, in accordance with an embodiment.

Referring to FIG. 12, the portable device 1100 worn around a wrist of a user includes an image sensing unit 1110.

The image sensing unit 1110 emits light toward a dorsum of a hand of the user. In this example, the dorsum of the hand is a target area.

The user provides an input to the image sensing unit 1110 using a motion of a finger in the target area in which the light emitted from the image sensing unit 1110 arrives. For example, the user may draw a character on the dorsum using the finger or touch the dorsum using the finger. In this example, the finger of the user is an object.

The portable device 1100 senses a vibration or a sound occurring when the finger is in contact with the dorsum. In this example, the portable device 1100 defines the target area as a 2D plane based on the contact between the finger and the dorsum. Because the image sensing unit 1110 senses the object only using a portion of row pixels, power consumption of the portable device 1100 is low. The image sensing unit 1110 merges the portion of row pixels to compensate for a decrease in sensitivity due to a burst mode.

The image sensing unit 1110 senses a position and a movement of the finger on the dorsum of the hand based on reflected light from the finger back to the image sensing unit 1110. The image sensing unit 1110 transmits sensing data to the portable device 1100.

The portable device 1100 performs an operation corresponding to the user input to the dorsum of the hand based on the sensing data. For example, the portable device 1100 performs the operation in response to the user input, for example, an input of a character and a touch input.

FIG. 13 is a flowchart illustrating an example of an operating method of an image sensing apparatus, in accordance with an embodiment.

Referring to FIG. 13, in operation 1310, the method, through an image sensing apparatus, emits light to a target area using an optical source.

The optical source emits light to the target area. The optical source is exposed to an outside surface of the image sensing apparatus to emit light to the target area.

The optical source may be, for example, an LED based source, a laser, an incandescent source such as a filament lamp and a halogen lamp, and a fluorescent source. The LED based source may be, for example, an infrared LED, an ultraviolet LED, a red LED, a blue LED, a green LED, a yellow LED, an amber LED, an orange LED, and a white LED. Among the foregoing examples, the optical source is the infrared LED.

The optical source operates based on a burst mode including a turn-on cycle and a turn-off cycle. The optical source reduces power consumption using the burst mode. A description of the burst mode provided in the foregoing may be applicable here.

In operation 1320, the method, through the image sensing apparatus, collects light reflected by an object located in the target area using a light collector. The light collector collects the light reflected by the object located in the target area. The light collector includes a condensing lens or a pinhole to collect the reflected light.

In operation 1330, the method, through the image sensing apparatus, receives the reflected light using a pixel array of an image sensor. The image sensor includes the pixel array. The pixel array includes a circuit and a photodiode connected to the circuit. The image sensor includes a row scanner to select a row pixel of the pixel array, a column scanner to select a column pixel of the pixel array, and an ADC to convert an analog voltage of a pixel selected by the row scanner and the column scanner to a digital signal. The configuration of the image sensor detailed in the foregoing may be applicable here.

In operation 1340, the method, through the image sensing apparatus, extracts sensing data on a position of the object in the target area based on the reflected light. The method extracts the sensing data on the position of the object in the target area based on a distribution of an amount of light obtained through the pixel array. The sensing data on the position of the object described in the foregoing may be applicable here.

The units, the row scanner, the column scanner, the subtractor, and the portable device described herein are implemented using hardware components. For example, the hardware components may include controllers, processors, sensors, microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

It is to be understood that in the embodiment of the present invention, the operations in FIG. 13 are performed in the sequence and manner as shown although the order of some operations and the like may be changed without departing from the spirit and scope of the described configurations. In accordance with an illustrative example, a computer program embodied on a non-transitory computer-readable medium may also be provided, encoding instructions to perform at least the method described in FIG. 13.

Program instructions to perform a method described in FIG. 13, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image sensing apparatus, comprising:
an optical source configured to emit light to a target area;
a light collector configured to collect light reflected by an object located in the target area; and
an image sensor configured to receive the reflected light using a pixel array and output sensing data of a position of the object in the target area based on the reflected light,
wherein the optical source is configured to operate in a burst mode comprising a turn-on cycle and a turn-off cycle, wherein the optical source emits light in the turn-on cycle and stops emitting light in the turn-off cycle, and
wherein, in response to the optical source operating in the burst mode, output data of an area of a predetermined size in the pixel array is merged a compensate a lack of the received reflected light caused by the turn-off cycle.

2. The apparatus of claim 1, wherein the pixel array comprises two-dimensionally arranged pixels.

3. The apparatus of claim 1, wherein the image sensor is configured to operate as an array sensor configured to sense a three-dimensional (3D) position of the object or a line sensor configured to sense a two-dimensional (2D) position of the object.

4. The apparatus of claim 1, wherein the image sensor comprises:
the pixel array configured to output an amount of the reflected light as a voltage;
a row scanner configured to select a row pixel of the pixel array;
a column scanner configured to select a column pixel of the pixel array; and
an analog-to-digital converter (ADC) configured to convert to a digital signal an analog voltage of a pixel selected by the row scanner and the column scanner.

5. The apparatus of claim 1, wherein the pixel array comprises pixels arranged in a linear circuit and a photodiode connected to the circuit, and
wherein the photodiode is connected to the circuit and has a long shape.

6. The apparatus of claim 1, further comprising:
a subtractor configured to eliminate external light based on a difference between an amount of light in the turn-on cycle and an amount of light in the turn-off cycle.

7. The apparatus of claim 2, wherein the at least a portion of the output data of the pixels is merged based on a charge domain, an analog domain, or a digital domain based on a readout circuit of the reflected light.

8. The apparatus of claim 3, wherein, in response to the target area being defined as a 2D plane, the image sensor is configured to operate as the line sensor configured to sense the object located on the 2D plane.

9. The apparatus of claim 3, wherein the target area is defined as the 2D plane in response to a contact between the object and the 2D plane, and
wherein the contact is sensed based on at least one of a vibration and a sound occurring in the target area.

10. The apparatus of claim 3, wherein, in response to the target area being defined as a 3D space, the image sensor is configured to operate as the array sensor configured to sense the object located in the 3D space.

11. The apparatus of claim 6, further comprising:
a memory configured to store the amount of light in the turn-on cycle to eliminate the external light.

12. A portable device, comprising:
an image sensing unit comprising
an optical source configured to emit light to a target area,
a light collector configured to collect light reflected by an object in the target area, and
an image sensor configured to receive the reflected light through a pixel array and output sensing data; and
a processor configured to determine a position of the object in the target area using the sensing data,
wherein the optical source is configured to operate based on a burst mode comprising a turn-on cycle and a turn-off cycle, wherein the optical source emits light in the turn-on cycle and stops emitting light in the turn-off cycle, and
wherein, in response to the optical source operating in the burst mode, output data of an area of a predetermined size in the pixel array is merged a compensate a lack of the received reflected light caused by the turn-off cycle.

13. The portable device of claim 12, wherein the pixel array comprises two-dimensionally arranged pixels.

14. The portable device of claim 12, wherein the processor is configured to define the target area as a two-dimensional (2D) plane or a three-dimensional (3D) space, and generate a control signal to allow the image sensing unit to switch an operation as an array sensor to sense a 3D position of the object or as a line sensor to sense a 2D position of the object.

15. The portable device of claim 12, wherein the target area is at least a portion of a body of a user, and the object is a finger of the user.

16. The portable device of claim 12, wherein the pixel array comprises pixels two-dimensionally arranged in rows and columns, each pixel including a circuit and a photodiode connected to the circuit and detecting an amount and a distribution of reflected light, wherein a row value of the rows of the pixels and a column value of the columns of the pixels indicate addresses of the detected amount of the reflected light, wherein the image sensor further comprises
a row scanner configured to select a row pixel of the pixel array; and
a column scanner configured to select a column pixel of the pixel array.

17. The portable device of claim 12, wherein the image sensor using the pixel array operates as a line sensor in one time section or as an array sensor in another time section to reduce power consumption.

18. The portable device of claim 12, wherein the processor determines the position of the object based on an address of the pixel array having a largest amount of reflected light.

19. The portable device of claim 14, further comprising:
a sensor configured to sense at least one of a vibration and a sound occurring in the target area,
wherein the processor is configured to define the target area as the 2D plane based on the at least one of the vibration and the sound occurring in the target area.

20. The portable device of claim 16, wherein the column scanner sequentially selects the column pixel based on the selected row pixel, and transmits a voltage output of the pixel array to an analog to digital converter to convert the voltage output to a digital signal.

21. An operating method of an image sensing apparatus, comprising:
configuring the optical source to operate based on a burst mode comprising a turn-on cycle and a turn-off cycle;
emitting light in the turn-on cycle and stopping an emission of light in the turn-off cycle emitting light to a target area using an optical source;
collecting light reflected by an object located in the target area using a light collector;
receiving the reflected light using a pixel array of an image sensor;
merging a portion of output data of pixels of an area of a predetermined size in the pixel array is merged a compensate a lack of the received reflected light caused by the turn-off cycle in the pixel array, in response to the optical source operating in the burst mode; and
outputting sensing data of a position of the object in the target area based on the reflected light.

22. The operating method of claim 21, wherein the pixel array comprises two-dimensionally arranged pixels.

23. The operating method of claim 21, further comprising:
configuring the image sensor to operate as an array sensor to sense a three-dimensional (3D) position of the object or a line sensor to sense a two-dimensional (2D) position of the object.

24. The operating method of claim 21, further comprising:
configuring the pixel array to comprise pixels two-dimensionally arranged in rows and columns, each pixel comprising a circuit and a photodiode connected to the circuit and detecting an amount and a distribution of reflected light.

25. The operating method of claim 24, wherein, in response to an amount of reflected light decreasing due to a decrease in an amount of the emitted light, further comprising:
compensating the decrease in the amount of the reflected light by widening an area of the photodiode.

* * * * *